United States Patent [19]

Freeman et al.

[11] 4,311,378
[45] Jan. 19, 1982

[54] FILM ADVANCE INDICATOR

[75] Inventors: E. Thomas Freeman, Poquoson; Charles W. Stump; Francis W. Dreisbach, both of Hampton, all of Va.

[73] Assignee: The United States of America as represented by the Administrator of the National Aeronautics and Space Administration, Washington, D.C.

[21] Appl. No.: 171,934

[22] Filed: Jul. 18, 1980

[51] Int. Cl.³ ............................................. G03B 17/36
[52] U.S. Cl. ..................................... 354/217; 354/289; 352/171
[58] Field of Search ....................... 354/217, 218, 289; 352/171

[56] References Cited

U.S. PATENT DOCUMENTS

| | | | |
|---|---|---|---|
| 4,021,828 | 5/1977 | Iura et al. | 354/217 |
| 4,114,995 | 9/1978 | Stieringer et al. | 352/171 |
| 4,174,888 | 11/1979 | Hunn et al. | 354/217 |
| 4,191,463 | 3/1980 | Urano et al. | 354/217 |

FOREIGN PATENT DOCUMENTS 2521158 11/1976 Fed. Rep. of Germany ...... 354/217

OTHER PUBLICATIONS

Electronics Engineers' Handbook, Fink & McKenzie, McGraw-Hill, First Edition, pp. 10-13, Sep. 24, 1975.

*Primary Examiner*—Russell E. Adams
*Attorney, Agent, or Firm*—Howard J. Osborn; John R. Manning; William H. King

[57] ABSTRACT

A film advancement indicator which includes an optical sensor 21 that detects the rotational movement of a disc 18 that rotates only when the film 14 advances. When the film 14 does not advance, an indicator light 29 is activated. A counter 26 is included in the electronic circuit to determine the number of film frames advanced.

1 Claim, 3 Drawing Figures

FILM ADVANCE INDICATOR

ORIGIN OF THE INVENTION

The invention described herein was made by employees of the United States Government and may be used by or for the Government for governmental purposes without the payment of any royalties thereon or therefor.

BACKGROUND OF THE INVENTION

This invention relates generally to cameras and more particularly concerns apparatus for indicating the advancement of film in cameras.

In some areas of camera use, such as in scientific research, it is desirable to have a highly reliable photographic system. In the Space Shuttle Program, one such area, the external cameras of the Shuttle are subject to the extreme cold of space. In extreme cold, the film becomes brittle and needs to be monitored for breakage. A mechanism that will accurately monitor film advancement in the remote Shuttle cameras and provide a positive indication of proper advancement is needed.

Previous mechanisms have not proven to be entirely satisfactory. For example, one such mechanism has a sensing finger that by detecting the presence of perforations in the film, usually one per frame, can tell whether the film is advancing. This sensing finger actually enters the perforation and prevents further advancement until it is withdrawn. Inherently this type of mechanism damages film and impairs camera operation. In the Shuttle Program it is important that the mechanism in no way damages the film or impairs the operation of the camera.

Another mechanism indicates film advancement by detecting when film is delivered from a film roll. A cam-like block is mounted on the shaft supporting the film roll so that the block rotates when the shaft rotates. When the block rotates, the corners of the block touch a flat strip located parallel to the periphery of the block causing the strip to lose contact with an electrical circuit. This intermittent loss of contact with the circuit causes a light to flash, indicating that film has been delivered from the roll. This type of mechanism inherently involves wear, thus reducing its reliability.

Since the cameras now in use are very reliable, a simple add-on mechanism to indicate proper film advancement is desired. Previous mechanisms have not been satisfactory in that they reduce the reliability of the camera.

Accordingly, an object of the present invention is to detect film advancement without damage to the film or impairment of camera operation.

Another object is to indicate whether the film is advancing properly frame by frame without use of special film.

A further object is to detect film advancement in remote cameras and provide a positive indication of proper advancement.

Still another object is to provide an indicator that can be added to the camera without affecting its photographic or operational reliability and without major modifications.

Other objects and advantages of this invention will become apparent hereinafter in the specification and drawings.

SUMMARY OF THE INVENTION

In the embodiment of the invention selected for illustration, the above objects are achieved by integrating a circuit device concept with a camera film guide roller. A disc with equally spaced holes around its periphery is mounted to rotate with the roller. A slotted optical sensor is mounted so that the outside edge of the disc moves between the transmitter and receiver of the sensor and so that the holes become aligned with the sensor light as the disc rotates. Film advancement rotates the roller and attached disc. This rotational movement interrupts the sensor light as the spaces between the holes move past the sensor. An electronic circuit counts the interruptions of the light to give an indication of the amount of film that has been exposed. The electronic circuit also indicates when the interruptions stop thereby signaling that the film is no longer passing through the camera. This invention provides positive verification signals of film advancement and of the amount of film exposed.

DETAILED DESCRIPTION OF THE INVENTION

Figure 1:
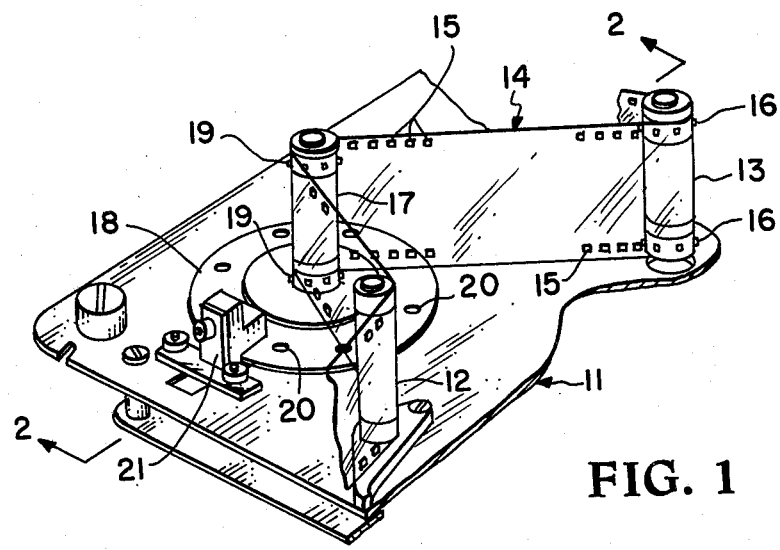
FIG. 1 is a partial pictorial view of a camera incorporating the embodiment of the invention selected for illustration.

Turning now to the specific embodiment of the invention selected for illustration in the drawings, the number 11 designates a camera transporter on which film guide rollers 12 and 13 are rotationally mounted. Film 14 is normally threaded through the camera from an outside film reel (not shown) past film guide rollers 12 and 13 through the focal plane past two more film guide rollers (not shown) and onto an outside takeup reel (not shown). The film 14 normally used has perforations 15 along both edges and the film guide rollers 12 and 13 have extrusions 16 that correspond with the perforations 15 in the film 14 to assure for proper film alignment and feeding.

Figure 2:
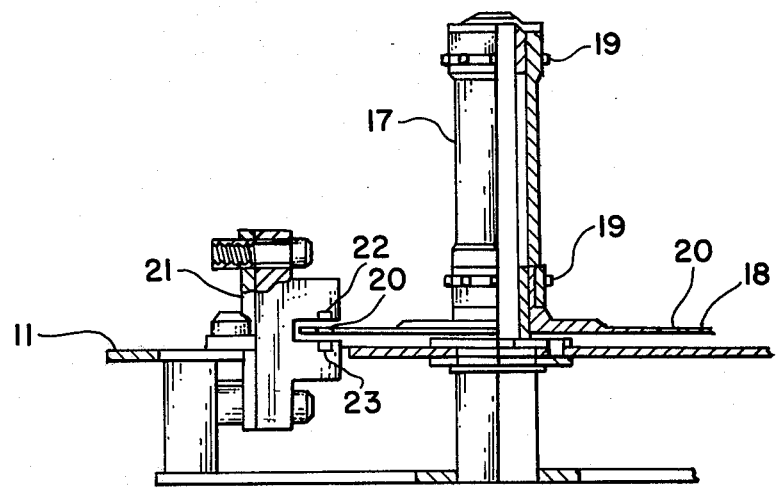
FIG. 2 is a sectional view along line 2—2 of the mechanism depicted in FIG. 1.

Referring to FIGS. 1 and 2 in the present invention, a film guide roller 17 to which a disc 18 has been rotationally attached is mounted to rotate freely on the film transport 11. Roller 17 is offset from and beteeen rollers 12 and 13. The film 14 is threaded from the outside reel past roller 12 around roller 17 to roller 13 and then through the focal plane. The offset provides for a tensional and firctional contact of the film 14 with roller 17 so that the roller rotates when the film 14 advances. For added assurance against slippage, roller 17 has extrusions 19, the same type extrusions that are on rollers 12 and 13, that interconnectedly associate with the perforations 15 in the film 14.

The disc 18 which is attached to roller 17 has eight equally spaced holes 20 about its periphery. A slotted optical sensor 21 is mounted on the transport 11 close to the periphery of disc 18 so that the transmitting section which is a light-emitting diode (LED) 22 and the receiving section which is a photodetector 23 align with the holes 20 in the disc 18. (See FIG. 2).

Figure 3:
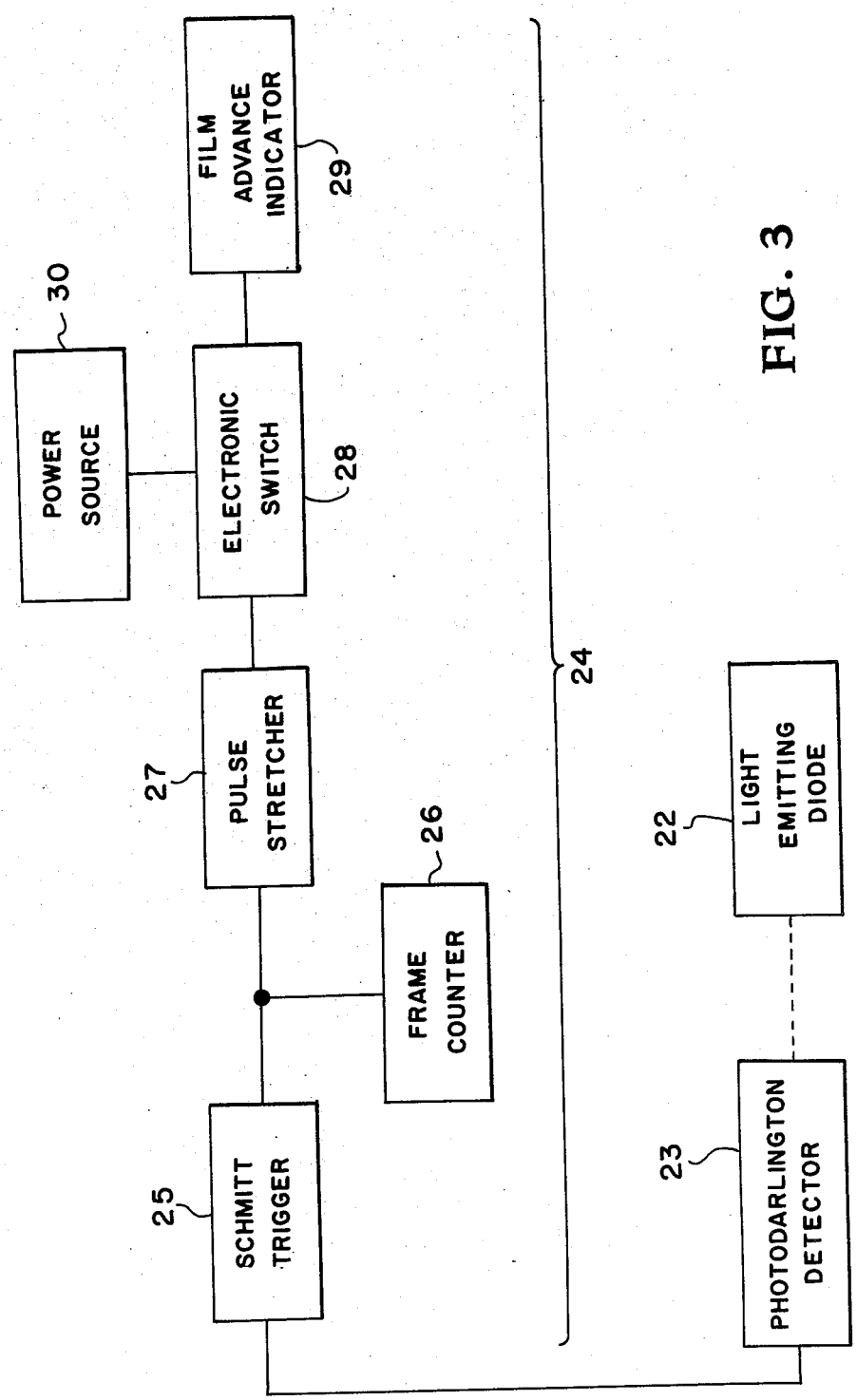
FIG. 3 is a block diagram of the electronic circuit used in this embodiment of the invention.

Referring to FIG. 3, a signal means 24 includes a Schmitt trigger 25 that shapes the output pulses of the photodetector 23; a counter 26 that picks up these pulses thereby counting the number of frames; a pulse stretcher 27 that produces a pulse of predetermined length; an electronic switch 28 activated by the lengthened pulse; and an indicator 29 that is connected to a power source 30 by the electronic switch 28.

In operation when the film 14 advances, roller 17 and disc 18 rotate, causing interruptions of the light to the photodetector 23 when the spaces between the holes 20 pass between the LED 22 and detector 23. Each interruption produces a pulse from the detector 23. The pulses from the detector 23 go into the Schmitt trigger 25 which shapes the pulses by converting a minimum of two interruptions (pulses), which in this case equals one frame of film, into a single pulse. Counter 26 picks up these pulses and counts the number of frames advanced. The pulses also go into the pulse stretcher 27 which produces a pulse of predetermined time length. This pulse operates the electronic switch 28 which connects the indicator 29 to the power source 30, causing the indicator light to remain lit for that time interval.

The advantages of this mechanism are numerous and it is particularly adapted for use in the Space Shuttle cameras since the mechanism and signals produced are isolated from the other camera mechanisms and in no way interfere with camera operation.

Another advantage of this mechanism is that the output from the detector can be picked up by a remote signal means. For example, the output from the detector in a Shuttle camera can go into the Shuttle's computer network, which will relay the information to Shuttle control, giving an indication of film advancement in the remote cameras.

Still another advantage is the greater servicability of the mechanism. If the unit should happen to malfunction, it could easily be removed and replaced with a new unit.

It is to be understood that the form of the invention herewith shown and described is to be taken as a illustrative embodiment. Various changes may be made without departing from the spirit or scope of the invention as defined in the following claims. For example, meter movement (a dial indicator) could be used in bright sunlight when a light would be difficult to see or when power consumption is a factor.

What is claimed as new and desired to be secured by Letters Patent of the United States is:

1. In a camera a mechanism for indicating the advancement of the film comprising:
    a circular disc with equally spaced holes lying in a circle concentric with and near to the periphery of said disc, mounted for rotational movement;
    a film guide roller means rotationally attached to said disc and in frictional contact with the film for rotating said disc only when the film advances;
    a hole detecting means located at a point close to the periphery of said disc for detecting said holes as they move past said point, said hole detecting means is comprised of a light souce positioned close to one surface of said disc at said point and a light detector positioned close to the opposite surface of the disc and in line with the light source so that when the disc moves, the holes pass between the light source and detector and allow the light from the souce to reach the detector, which then sends out a pulse when the light to the detector is interrupted; and
    a signal means connected to said hole detecting means for providing an indication of the movement of said holes, wherein the circuit to said signal means includes a Schmitt trigger for shaping the pulses from the sensing means into one pulse per frame;
    a counter for counting these pulses;
    a means for stretching each of the pulses;
    an electronic switch activated by each of the stretched pulses;
    an indicator; and
    a power source connected to the indicator by the electronic switch during the time said switch is activated.

* * * * *